United States Patent

[11] 3,622,104

| [72] | Inventors | Charles Frederick David Clarke<br>Walton-on-Thames;<br>Ralph Spenser Hooper, Ham, both of England |
|---|---|---|
| [21] | Appl. No. | 19,550 |
| [22] | Filed | Mar. 19, 1970 |
| [45] | Patented | Nov. 23, 1971 |
| [73] | Assignee | Hawker Siddeley Aviation Limited<br>Kingston-upon-Thames, Surrey, England<br>Continuation-in-part of application Ser. No. 707,143, Feb. 21, 1968, now abandoned.<br>This application Mar. 19, 1970, Ser. No. 19,550 |

[54] AIRCRAFT
5 Claims, 3 Drawing Figs.

| [52] | U.S. Cl. | 244/12 B |
|---|---|---|
| [51] | Int. Cl. | B64c 29/00 |
| [50] | Field of Search | 244/12, 23 |

[56] References Cited
UNITED STATES PATENTS

| 2,870,978 | 1/1959 | Griffith | 244/23 B |
|---|---|---|---|
| 3,347,493 | 10/1967 | Leathley | 244/12 B |

*Primary Examiner*—Milton Buchler
*Assistant Examiner*—Steven W. Weinrieb
*Attorney*—Dowell and Dowell

ABSTRACT: An aircraft engine assembly is provided for a V/STOL aircraft which comprises a longitudinally disposed continuously rated vectored thrust propulsion engine having its jet efflux issuing through two laterally spaced dirigible jet nozzles at its aft end, the positioning in the aircraft being such that when these two dirigible nozzles are down-turned to give lift their combined thrust line is a few inches forward of the aircraft center of gravity. Between the two laterally spaced dirigible nozzles there is mounted substantially vertically a direct lift jet engine the thrust line of which lies a few inches aft of the aircraft center of gravity.

PATENTED NOV 23 1971 3,622,104
SHEET 1 OF 2
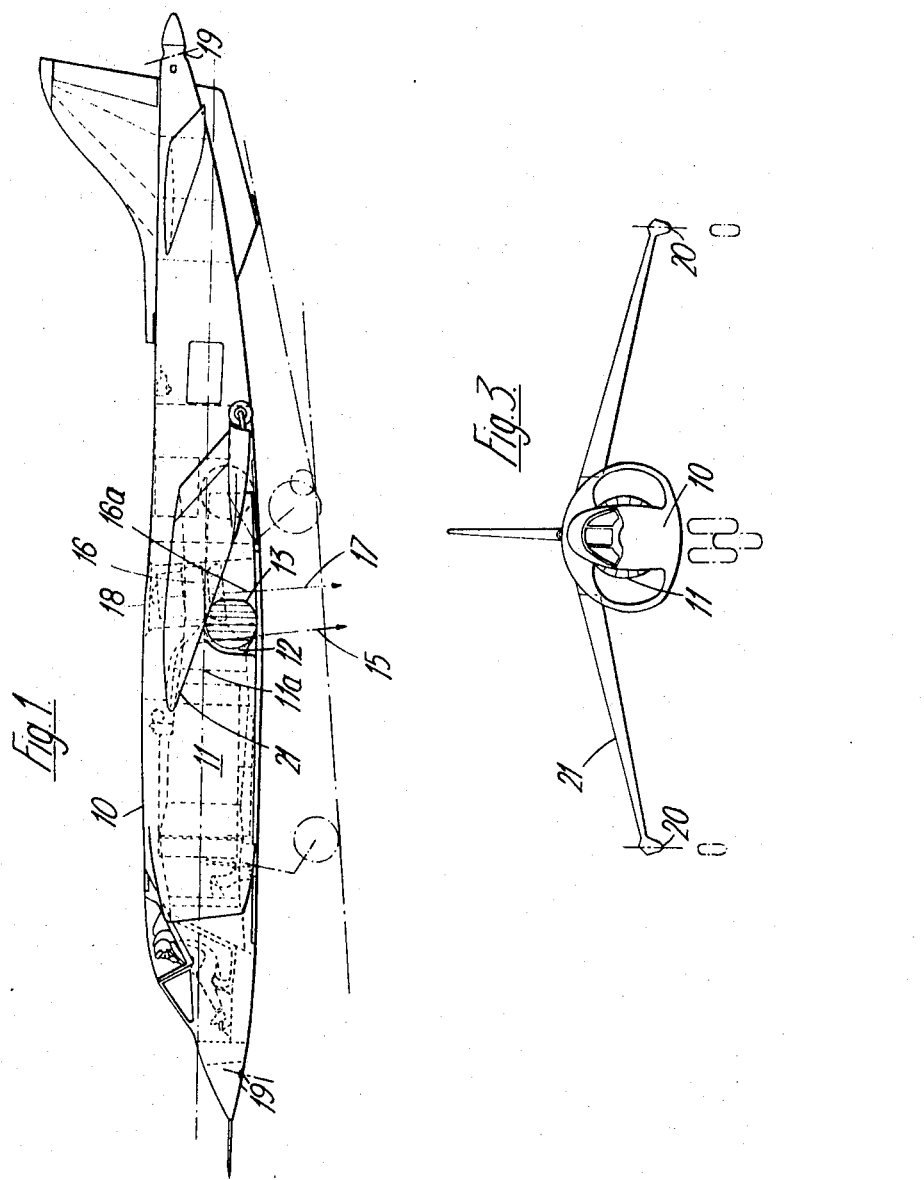
Inventors:-
Charles Frederick David Clarke
Ralph Spenser Hooper
By
Dowell Dowell
Attorneys

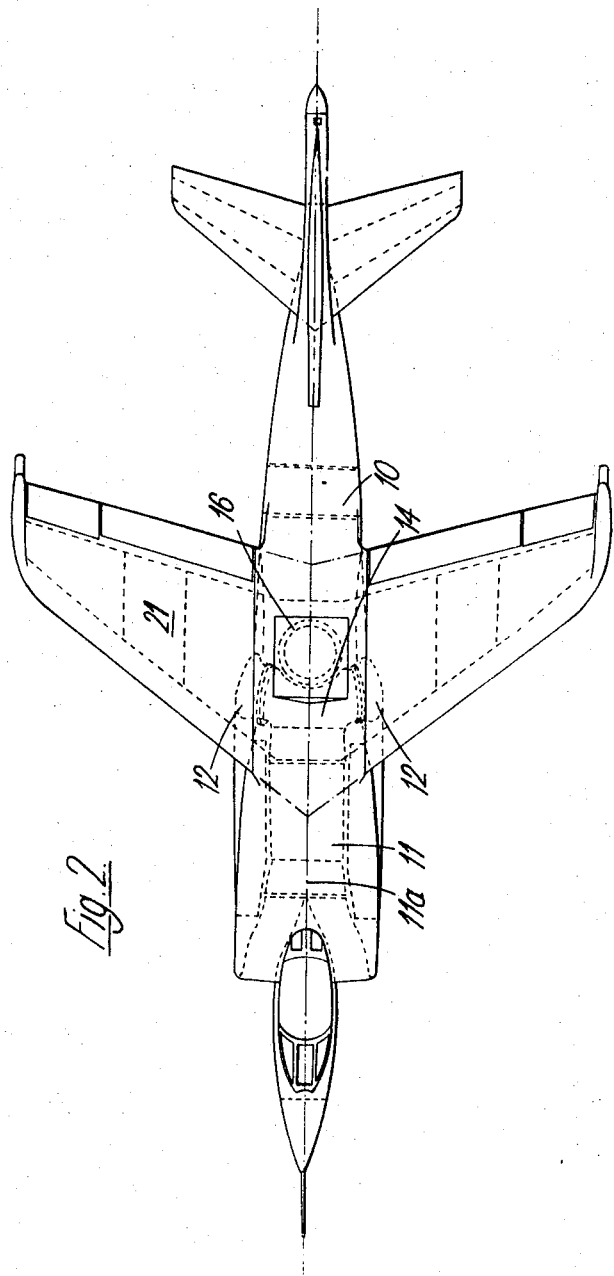

AIRCRAFT

This application is a continuation-in-part of Ser. No. 707,143 filed Feb. 21, 1968, now abandoned.

DESCRIPTION OF INVENTION

This invention relates to aircraft of the vertical or short takeoff and landing types.

Within the general category of V/STOL aircraft which rely on upward thrust from downwardly directed jet nozzles for lift during takeoff and transition to normal forward flight, there are two major types. In one type there are one or more vectored thrust engines rated for continuous operation and equipped with dirigible jet nozzles that can be turned so as to give either lift or forward propulsion or a combination of these. The other type has a conventional continuously rated jet propulsion engine, without dirigible nozzle, for forward thrust, and separate lift engines with downwardly directed jet effluxes to provide the necessary jet lift.

In the latter case, since the lift engines only need operate during takeoff, transition and landing they do not have to be rated for continuous operation but can be designed to run for comparatively brief periods at a time. The usual fixed lift engine is therefore of much less expensive construction and has a considerably higher thrust to weight ratio than a continuously rated engine intended for forward propulsion. Nevertheless, since the thrust output of a single lift engine alone is generally speaking insufficient to bear the weight of a practical airplane, all known forms of aircraft employing separate engines for lift and horizontal thrust are fitted with a multiplicity of lift engines. While the fact that, with this arrangement, none of the lift engine thrust can be useful in propelling the aircraft forward, and none of the propulsion engine thrust provides lift, is offset to a considerable degree by the lift engines being comparatively small, light and inexpensive for the thrust they produce, there are other serious disadvantages. The provision of a multiplicity of engines makes for considerable complication in the control of the aircraft and, while the lift engines are normally installed such that their resultant thrust passes through the center of gravity of the aircraft, failure of one lift engine may cause dangerous out-of-balance at critical phases in the flying of the aircraft; indeed, in such an event other lift engines may have to be shut down automatically.

These disadvantages inherent in a multiplicity of lift engines are not met with in the case of a multiple nozzle vectored thrust engine supplying both lift and propulsive thrust. But with that type of arrangement the continuously rated engine required can be expected to be bigger than it need be to supply forward propulsive thrust alone; the lifting thrust requirement is ordinarily the greater since the maximum takeoff weight of an aircraft is limited by the lift available. Thus, during normal forward flight the engine is operating at below full power and likely to be less efficient as a consequence. Additionally, none of the lifting thrust is being produced at the advantageously high thrust/weight ratio which is possible with a lift engine due to the fact that it is only required to run for brief periods.

It is therefore an object of the present invention to provide a more advantageous solution.

According to the present invention, in its simplest form, the aircraft is fitted with a continuously rated vectored thrust propulsion engine having two laterally spaced dirigible jet nozzles at its aft end, and a lift engine is mounted, preferably with its axis vertical, in the region between these two nozzles. With this arrangement, it is possible for the line of resultant thrust of the two dirigible nozzles, when they are directed downward to give lift, and the thrust line of the lift engine, to lie very close to one another and to the center of gravity of the aircraft. This means that the aircraft will, in practice, be stable in the event of either engine failing. In this context the term "stable" does not imply complete dynamic stability but a condition sufficiently near stability for the aircraft to be maintained in a more or less normal attitude without particular difficulty in spite of the loss of one line of jet lift thrust due to the engine failure.

In the preferred arrangement, the resultant lifting thrust line of the dirigible nozzles of the main propulsion engine is a few inches forward of the center of gravity of the aircraft, while the thrust line of the lift engine is a few inches aft. The weight of a aircraft is greatest at takeoff due to full fuel tanks; consequently, while both the main engine and auxiliary lift engine will be used at takeoff it is contemplated that landing can be accomplished with only the main engine. This makes it unnecessary to reignite the lift engine while flying; and also by arranging the fuel tanks so that the center of gravity is slightly aft of normal when the maximum fuel load is aboard, the resultant thrust line of the two engines together can be made to pass substantially through the aftshifted center of gravity at takeoff while the lifting thrust line of the main engine alone passes substantially through the normal center of gravity at landing.

The engine layout in accordance with the invention will now be described by way of example, with reference to the accompanying drawings, in which:

FIG. 1 is a side elevation of an aircraft,
FIG. 2 is a plan view, and
FIG. 3 is a front elevation.

The drawings show a V/STOL aircraft having a single continuously rated main jet engine of the vectored thrust type for providing the forward propulsive thrust, or lifting thrust, or a combination of the two, according to the angular position of the dirigible jet nozzles. This main engine 11 is disposed horizontally in the fuselage 10 with its axis 11a fore-and-aft and it has two laterally spaced dirigible nozzles 12 at its aft end. These nozzles having openings 13 at the sides of the fuselage 10 and the gases exhausting from the turbine of the engine are led to them by means of Y-branched ducting 14. The resultant thrust of the two nozzles 12, when they are turned to direct their jet effluxes downward and thereby provide lift, is along a line 15 a short distance forward of the center of gravity of the aircraft at takeoff.

Nested closely within the Y of the branched ducting 14 is an auxiliary lift engine 16 disposed with its axis 16a substantially vertical. This engine draws its air supply through an intake 18 in the top of the fuselage and its jet efflux is directed downwardly along a thrust line 17 substantially parallel to that of the down-turned nozzles of the main engine and a little aft thereof. The thrust line 17 is just aft of the center of gravity of the aircraft at takeoff, and the arrangement is such that the resultant of the two thrust lines 15, 17 passes substantially through the center of gravity. Since the lift engine 16 is only used for brief periods at a time, and not at all during normal forward flight, it does not have to be a continuously rated engine but instead its construction is such that life and duration are sacrificed in order to obtain small size and weight and low cost for a given thrust.

The advantage of an airplane arranged as described can best be demonstrated by quoting a typical example. It is known that vectored thrust engines, like the engine 11, are available developing a thrust of the order of 20,000 lbs. An airplane fitted with such an engine would be capable of true vertical takeoff at a takeoff weight of approximately 80 percent of the developed thrust, If the takeoff weight was increased, by increasing the fuel load carried, if necessary by means of externally fitted fuel tanks, the airplane could still takeoff, at a maximum weight somewhat exceeding the thrust, as long as the actual liftoff was preceded by a short ground-run. Thus the operating range could be increased by a matter of about 200 percent if a ground-run of the order of 1,000 ft. were acceptable.

If, on the other hand, one adds to the vectored thrust engine a pure lift engine, like the engine 16, increasing the total thrust at takeoff to 125 percent of the original, the range of the same airplane under the vertical takeoff condition would be more than doubled. The maximum range would be approximately the same as before but it could be achieved at a ground-run of only about 400 ft.

By fitting an even larger lift engine the takeoff thrust could be increased to about 150 percent of the original. The original maximum takeoff range of the unmodified aircraft with ground-run can then be obtained under pure vertical takeoff conditions, or zero ground-run.

These increased performances can only be obtained as long as there is no need for the designer to make allowances for maintaining balance in the case of one engine failure. It will be apparent that it would be quite impossible to maintain proper balance of an airplane in engine-borne flight if, due to failure of one engine, there was a sudden loss of thrust of the order of 25–30 percent of the total, unless the resultant thrust lines of the two engines were closely adjacent to each and to the center of gravity of the aircraft.

The usual way of controlling the attitude of such an aircraft in the engine-borne flight mode is by means of small jets 19, 20 at the extremities of the wings and fuselage. These jets would usually be fed from a suitable bleed point of the compressor of the main engine. However, from the point of view of economy in the use of high-pressure air it may be advantageous to take a bleed form both engines 11, 16. These flows can then be combined or alternatively the bleed from the lift engine 16 can be led to the forward attitude control jet 19 at the front of the fuselage 10. In the latter case, some degree of automatic balancing is obtained, i.e. the short arm moment of the large lift engine thrust along the line 17 aft of the center of gravity is either wholly or partially balanced by the long arm moment of the small amount of lift obtained from the attitude control jet 19 at the nose.

From the military aspect, it may be advantageous that the aircraft can sometimes fly with the lift engine 16 completely removed. In this case it could take off vertically at reduced weight; and it could still operate at maximum weight either as a conventional aircraft with a normal takeoff run or in the STOL mode. Taking out the lift engine 16 would leave room for an extra fuel tank to be installed which would considerably increase the normal range of the aircraft, for example for ferrying purposes.

It will be noted that the air intake 18 for the lift engine 16, which is at the top of the fuselage 10 above the wing 21, is in the best position for avoiding undesirable interference between the jet efflux and the intake air.

While the invention has been described in its application to an aircraft with a single main engine and a single lift engine, it is also applicable in multiengined arrangements. For example, two or more main engines could be installed side by side in the fuselage with a number of lift engines nested amongst the ducts feeding their dirigible nozzles. Or the arrangement of a single main engine and a single lift engine as illustrated could be installed in a pod instead of an aircraft fuselage and a number of such pods attached to the wing or elsewhere on the aircraft.

We claim:

1. A V/STOL aircraft, with an engine assembly comprising a continuously rated vectored thrust propulsion engine mounted with its principal axis fore and aft, which engine has at least one forward-facing air intake at its forward end and two laterally diverging jet pipes with laterally spaced dirigible jet nozzles at its aft end but is incapable of providing the total lift requirement by itself, and a single lift engine designed for only short running periods mounted with its axis substantially vertical in a position where it is substantially nested between said two dirigible nozzles, said lift engine having an upward facing air intake and a downwardly directed fixed jet nozzle, and wherein the line of resultant thrust of said two dirigible nozzles, when they are directed downward to give lift, and the thrust line of the lift engine, both lie within a few inches of the center of gravity of the aircraft.

2. An aircraft according to claim 1, wherein the resultant lifting thrust line of said two dirigible nozzles of the propulsion engine is a few inches forward of the center of gravity of the aircraft, while the thrust line of said lift engine is a few inches aft of the center of gravity.

3. An aircraft according to claim 1, wherein both engines contribute high-pressure air to an aircraft attitude control system comprising small jets at the extremities of the wings and fuselage.

4. An aircraft according to claim 3, wherein air bled from said lift engine is supplied to a forward attitude control jet at the nose of the fuselage.

5. An aircraft according to claim 2, wherein the center of gravity of the aircraft shifts forwardly toward the lifting thrust line of said two dirigible nozzles as fuel is used up.

* * * * *